Patented Jan. 2, 1940

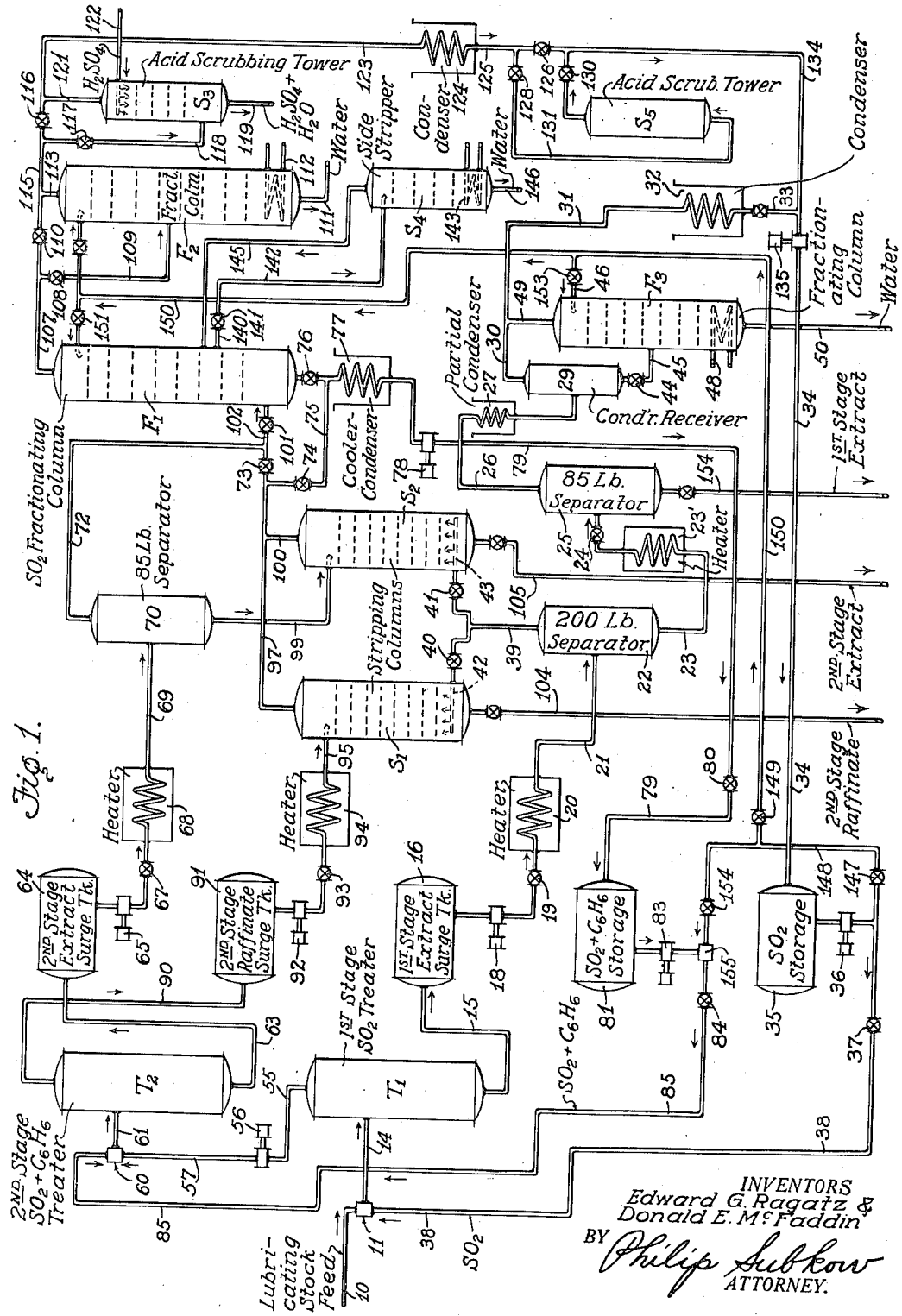

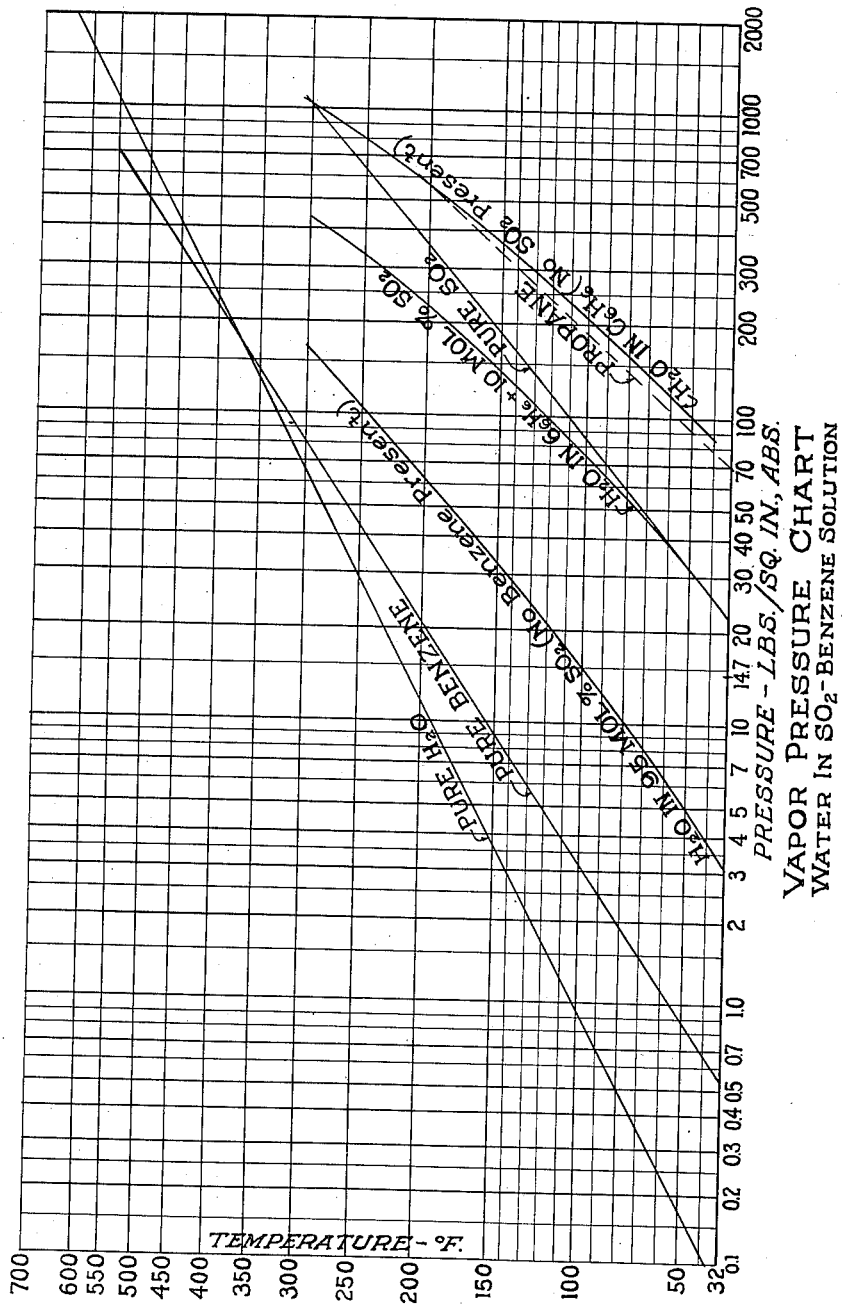

2,185,311

UNITED STATES PATENT OFFICE 2,185,311

SOLVENT RECOVERY

Edward G. Ragatz, Los Angeles, and Donald E. McFaddin, Richmond, Calif., assignors to Union Oil Company of California, Los Angeles, Calif., a corporation of California Application April 16, 1934, Serial No. 720,882

14 Claims. (Cl. 202—40)

This invention relates to a process and apparatus for the recovery of solvents from solutions resulting from the solvent process for treating lubricating oils. This invention relates more particularly to the recovery of sulphur dioxide and benzene from oil solutions resulting from the sulphur dioxide and sulphur dioxide-benzene process of solvent extraction of lubricating oils and to the continuous removal of water from solution in these solvents.

The sulphur dioxide and sulphur dioxide-benzene process for solvent extraction of lubricating oils illustrated here is conducted in two stages, the first producing a first stage extract containing sulphur dioxide in solution therewith, and the second producing a second stage extract and raffinate each containing both sulphur dioxide and benzene in solution. The separation of these constituents and recovery of the solvent from the second stage would ordinarily be a simple operation if it were not for the appearance in solution therewith of a small quantity of water which continuously enters by way of the raffinate feed to the second stage treater and by means of infiltration of air at the packing glands of pumps and compressors. It is necessary that this water be continuously eliminated or it will eventually accumulate to an extent sufficient to cause serious corrosion difficulties. The maximum allowable concentration of water in the treated sulphur dioxide has been found to be under .05%.

Pure liquid sulphur dioxide can be dehydrated by simple distillation or by contacting it with sulphuric acid in either the gaseous or liquid phases. However, in the new processes of solvent extraction employing the mixed solvent solution of sulphur dioxide and benzene active chemical reactions between the benzene and the sulphuric acid are such as to make this method of dehydration impracticable. It was necessary, therefore, to discover other methods by which these solvents could be recovered and purified.

Heretofore it was not known what the solubility relationships of sulphur dioxide, benzene and water were insofar as they effected vapor pressures governing distillation phenomena. It was generally assumed that these vapor pressures operated in the normal way and that because of the unfavorable relationships of these normal vapor pressures, separation of these constituents would, therefore, be difficult. But it has been discovered that solutions of sulphur dioxide, benzene and water, due to their limited mutual miscibility, have effective vapor pressures, or pseudo vapor pressures which are unexpectedly favorable to their separation by distillation.

Accordingly, it has been discovered that a mixed solution of sulphur dioxide and benzene containing water which has been separated by evaporation from the extract and raffinate oils, can be distilled in a fractionator in which substantially pure liquid sulphur dioxide is employed as reflux, to obtain fractionated vapors containing sulphur dioxide and a high concentration of water substantially free from benzene, and a bottoms liquid containing a high concentration of benzene and some sulphur dioxide substantially free from water. The sulphur dioxide vapors containing a high concentration of water thus separated from the benzene by fractionation can then be subsequently contacted with sulphuric acid or subjected to a secondary distillation stage for the removal of the water as heretofore conventionally employed, without the difficulties encountered when benzene is present.

This method of operation has been based on the recognition of the significance of the fact, as applied to distillation, that water has only a limited solubility in a mixture of benzene and sulphur dioxide. As a consequence of this limited solubility, water in solution in a solvent mixture of sulphur dioxide and benzene acts as though it possessed a vapor pressure in the pure state many times its normal vapor pressure. For example (see Figure 2) at 100° F. pure water has a vapor pressure of only .95 pound per square inch absolute, whereas we have calculated (from observed data) that when dissolved in sulphur dioxide, at the same temperature water acts as though its normal vapor pressure were 15 pounds per square inch absolute. Similarly in concentrations below saturation in benzene at 100° F. water acts as though its normal vapor pressure amounted to 210 pounds per square inch absolute. Finally, water in a mixed solution of sulphur dioxide and benzene, for example, a benzene-sulphur dioxide solution containing 10 mol. percent of liquid sulphur dioxide at 100° F., acquires a pseudo vapor pressure lying between the sulphur dioxide and benzene figures as exemplified by a 75 pounds per square inch absolute pseudo normal vapor pressure. Pure benzene at 100° F. exerts a vapor pressure of 3.3 pounds per square inch absolute while pure sulphur dioxide has an absolute vapor pressure of 84 pounds per square inch under the same conditions. Consequently we see that both water and sulphur dioxide can be distilled overhead from benzene by a simple distillation operation.

In a two-stage solvent extraction process employing sulphur dioxide and sulphur dioxide and benzene an appreciable quantity of sulphur dioxide is constantly conveyed in solution in the first stage raffinate from the first sulphur dioxide treating stage to the second sulphur dioxide-benzene treating stage. Consequently the first stage solvent system is continuously losing sulphur dioxide and the second stage is constantly gaining sulphur dioxide and it is, therefore, necessary to subject the recovered sulphur dioxide-benzene solvent to a fractionation as described hereinbefore in order to recover a sufficient quantity of substantially pure sulphur dioxide to return to the first stage solvent system to make up for this loss through the raffinate In the process of recovery of the sulphur dioxide-benzene solvent from the treated oils, the proportions of the two constituents in solution together in the recovered solvent are generally altered and it is impracticable to adjust the system to accomplish the recovery of the mixed solvent with the sulphur dioxide and benzene constituents in the exact proportions in which they are utilized in the treating process. This condition has been met and satisfactory control of solvent mixtures accomplished, by adjusting the system to effect a recovery of the mixed sulphur dioxide-benzene solvent in proportions such that the solvent recovered and returned to storage is slightly deficient in sulphur dioxide. The solvent then being withdrawn from storage to be returned into treating contact with oil is easily adjusted as to proportions of the mixture by constantly adding to it as it is withdrawn the required amount of liquid sulphur dioxide.

Objects of this invention are, therefore, to provide a process and apparatus for the recovery of solvents from sulphur dioxide and sulphur dioxide-benzene solvent treated oils. Another object of this invention is to provide means and apparatus to accomplish a constant elimination of water from the solvent system in order to maintain an extremely low concentration of water in solution in the solvents. Another object of this invention is to provide means and apparatus for the recovery and separation of a sulphur dioxide-benzene mixture of solvents containing water in concentrations below miscibility. Other objects of this invention are to provide means for maintaining a balance of the quantities of solvents and control of the proportions of the solvent mixtures throughout a solvent extraction system.

Other objects and features of novelty will be evident hereinafter.

The invention broadly stated comprises a process and apparatus for the recovery of sulphur dioxide and sulphur dioxide-benzene solvents from oils which have been treated by the sulphur dioxide and sulphur dioxide-benzene process of solvent extraction. The invention also comprises a process and apparatus for the recovery and separation of sulphur dioxide and sulphur dioxide-benzene solvents from solvent mixtures containing water in solution. The invention more specifically includes a process and apparatus for carrying out the process, for the separation of substantially water-free sulphur dioxide and sulphur dioxide-benzene solvents from a solvent solution of sulphur dioxide and benzene containing water in solution therewith, comprising a two stage treatment in which the sulphur dioxide, benzene and water solution is distilled with controlled liquid sulphur dioxide refluxing to produce a separation of the said solution into sulphur dioxide and benzene substantially free from water, and sulphur dioxide and water substantially free from benzene in the first stage, and the separation of the water from the separated sulphur dioxide and water by distillation or other methods of dehydration in the second stage. In other words, one phase of the invention resides in a process and apparatus for preventing the existence of more than an extremely low concentration of water in solution in the solvents throughout the solvent treating system. This invention also comprises in combination with a solvent extraction process and apparatus, a method and apparatus for recovering, separating and returning the solvent components to their respective solvent treating stages in the proper proportions and quantities required to maintain continuous operation.

This invention is embodied in a process and apparatus wherein the solvent solution of sulphur dioxide and benzene is subjected to a stage of distillation in a fractionating column in contact with substantially pure sulphur dioxide reflux under conditions such that an overhead of sulphur dioxide and water substantially free from benzene and a bottoms of sulphur dioxide and benzene substantially free from water is obtained. The invention also embodies a process and apparatus whereby the said fractionated sulphur dioxide and water overhead can be subsequently refractionated and/or treated with sulphuric acid to remove the water and recover a practically pure liquid sulphur dioxide solvent. The invention also is embodied in a combination of apparatus for a two stage sulphur dioxide and sulphur dioxide-benzene solvent extraction of oils whereby a portion of the sulphur dioxide solvent may be separated from the second stage recovered sulphur dioxide-benzene mixed solvent and returned as make-up solvent to the first stage sulphur dioxide solvent to balance the loss of sulphur dioxide which is carried from the first stage to the second stage through the first stage raffinate.

The accompanying drawings illustrate one embodiment of the invention in which Figure 1 is the flow diagram and Figure 2 is a vapor pressure chart upon which, in part, this invention is based in theory.

The vapor pressure chart of Figure 2 has been derived by computations made from known data insofar as they were obtainable and from observed data obtained experimentally relating to the vapor pressure-temperature characteristics of the solvent constituents dealt with here, both in their pure state and in varying degrees of solution in one another.

Between the right and left hand limits determined by the curves shown in Figure 2 and including the family of curves illustrated therein, lie pseudo normal vapor pressure values for water which may be obtained by interpolation, for variations of solution mixtures of benzene, sulphur dioxide and water. From these data it will appear that by simple fractional distillation, a separation of a solvent mixture of sulphur dioxide, benzene and water is possible, whereby fractionated vapors containing sulphur dioxide and water free from benzene are obtained.

Referring to Figure 1, the apparatus and method of operation is as follows: Lubricating oil stock which is to be treated enters the system through feed line 10 from which it flows to a mixing valve 11 where it meets and intimately mixes with a stream of liquid sulphur dioxide. The mixture of lubricating oil stock and the liquid sulphur dioxide flow from mixer 11 through line 14 into an intermediate section of the first stage sulphur dioxide treater tank $T_1$ at a pressure of 200 pounds per square inch where a phase separation of the extract and raffinate takes place. The first stage sulphur dioxide extract which contains a large percentage of the extraneous water which has entered the system by way of the lubricating oil feed stock and through infiltration through packing glands of pumps and compressors is removed from the bottom of the first stage treater $T_1$ through line 15 into a first stage extract surge tank 16. A pump 18 withdraws a constant quantity of first stage extract from tank 16 and forces it through valve 19 and heater 20 where it is heated to a temperature of about 165° F. The heated first stage extract is then introduced through line 21 into a high pressure flash separator 22 at a pressure of 200 pounds per square in. ga. where a portion of the sulphur dioxide solvent is vaporized and separated from the extracted oil and water. The sulphur dioxide vapors from separator 22 flow through line 39, valves 40 and 41 and inlets 42 and 43 to the second stage raffinate and extract stripper columns $S_1$ and $S_2$, respectively, to act as stripping vapors for the removal of sulphur dioxide and benzene from the second stage raffinate and extract as described hereinafter.

The unvaporized liquids are withdrawn from the high pressure separator 22 and are introduced through line 23, heater 23' and pressure reducing valve 24 into a low pressure separator 25 at a temperature of 300° F. and a pressure of 85 pounds per square inch where further evaporation and separation takes place. The vapors issuing from pressure separator 25 contain the balance of the sulphur dioxide solvent and a large percentage of the extraneous water which has entered the solvent system. These vapors are withdrawn from separator 25 through line 26 to a partial condenser 27 where most of the water vapor and a small amount of the sulphur dioxide solvent vapors are condensed. The resulting condensate and uncondensed vapors enter the condensate receiver 29. The separated, uncondensed sulphur dioxide vapors from the condensate receiver 29 are carried through lines 30 and 31 to a total condenser 32 and the resulting sulphur dioxide condensate, relatively free from water returned therefrom through lines 33 and 34 to the sulphur dioxide storage tank 35. Liquid sulphur dioxide solvent is withdrawn from the storage tank 35 by means of pump 36 and recirculated through valve 37 and line 38 to the hereinbefore described mixing valve 11 where it meets fresh incoming lube oil stock and is recycled through the system as described. The partial condensate formed in condenser 27 and collected in the condensate receiver 29 which contains a large percentage of the water separated from the sulphur dioxide solvent is introduced through valve 44 and inlet 45 into the fractionating column $F_3$. This sulphur dioxide and water condensate saturated with sulphur dioxide passes down through the stripping section of the column $F_3$ where it is evaporated and the resulting vapors are fractionated in the upper portion of the tower in countercurrent contact with substantially pure liquid sulphur dioxide reflux entering at 46. Heat is applied at the bottom of the stripping section of the column $F_3$ by means of heating coil 48 through which any suitable heating medium may be circulated. The fractionated vapors which are substantially pure sulphur dioxide, issue from the top of the fractionating column $F_3$ through the vapor outlet line 49 and join those vapors in line 30 from the condensate receiver 29 and flow through line 31 to the condenser 32. Substantially pure water from which the sulphur dioxide has been stripped is withdrawn from the bottom of the fractionating column $F_3$ through the water draw-off line 50.

The raffinate also containing some extraneous water from the top of the first stage sulphur dioxide treater $T_1$ is withdrawn through line 55 and by means of pump 56 delivered through line 57 to the mixing valve 60 where it meets and intimately mixes with a stream of mixed liquid sulphur dioxide and benzene solvent. The mixture of the first stage raffinate and the liquid sulphur dioxide-benzene solvent enters the second stage sulphur dioxide-benzene treater $T_2$ at a pressure of 200 pounds per square inch at an intermediate section through inlet 61.

The second stage sulphur dioxide-benzene extract which contains a large proportion of the sulphur dioxide and benzene solvent and some water in solution is withdrawn from the bottom of the second stage treater $T_2$ through line 63 from which it flows into the second stage extract surge tank 64. The second stage sulphur dioxide-benzene extract is withdrawn from the surge tank 64 by means of pump 65 and forced through valve 67 into heater 68 where it is heated to a temperature of approximately 300° F., after which it is introduced through line 69 into flash separator 70 at a reduced pressure of 85 pounds per square inch ga. where a quantity of the liquid sulphur dioxide-benzene solvent is evaporated and separated from the second stage extracted oil.

The vaporized sulphur dioxide-benzene solvent and water is withdrawn from separator 70 through line 72 and a large portion of the vapors allowed to flow through valve 101 and inlet line 75 into the sulphur dioxide fractionating column $F_1$.

The second stage sulphur dioxide-benzene raffinate which contains a much smaller portion of the sulphur dioxide-benzene solvent than the extract does is removed from the top of the second stage treater $T_2$ through line 90 and introduced into the second stage raffinate surge tank 91. The second stage sulphur dioxide-benzene raffinate is withdrawn from the surge tank 91 by means of pump 92 and introduced directly through valve 93, heater 94 and inlet line 95 at a temperature of 300° F. into the stripping column $S_1$, at a pressure of approximately 85 pounds per square inch, where it is stripped in countercurrent contact with rising sulphur dioxide stripping vapors introduced through inlet line 42, as described hereinbefore in connection with the first stage extract separation in separator 22.

The second stage extract liquid separated from a major portion of the solvent vapors in separator 70 is withdrawn through line 99 and introduced at a temperature of about 320° F. into the top of stripping column $S_2$. This second stage extract is countercurrently contacted with the hereinbefore described rising sulphur dioxide stripping vapors in stripping column $S_2$ to remove small quantities of remaining sulphur dioxide-benzene solvent, and these vapors are withdrawn from the top of stripping column $S_2$ through vapor line 100 where they join those vapors in line 97 from the stripping column $S_1$. The stripped sulphur dioxide-benzene vapors are withdrawn from the top of stripping column $S_1$ through vapor line 97 and joining the vapors from line 100 from the stripping column S₂ flow through valve 74 and line 75 to the condenser 77 where they are condensed. The resulting sulphur dioxide-benzene condensate from condenser 77 is returned by means of pump 78 at a pressure of 85 pounds per square inch through line 79 and valve 80 to the liquid sulphur dioxide-benzene solvent storage tank 81. Liquid sulphur dioxide-benzene solvent is withdrawn from storage tank 81 by means of pump 83 and returned at a pressure of about 225 pounds per square inch through valve 84 and line 85 to the mixing valve 60 and is recycled through the system as described.

The stripped bottoms formed in stripping columns S₁ and S₂ and the bottoms from separator 25 are withdrawn through lines 104, 105 and 154 as a second stage sulphur dioxide-benzene raffinate, a second stage sulphur dioxide-benzene extract and a first stage sulphur dioxide extract respectively, from which sulphur dioxide and benzene solvents have been largely removed. These said raffinates and extracts may be subsequently treated for the removal of the residual solvents remaining therein.

The sulphur dioxide, benzene and water vapors issuing from the separator 70 and a portion of the vapors issuing from the stripping columns S₁ and S₂ through lines 72, 97 and 100, respectively, as mentioned before, which are not returned through condenser 77, are introduced through valve 101 and inlet 102 into the sulphur dioxide fractionating column F₁ at a temperature of about 295° F. and a pressure of about 85 pounds per square inch where they are subjected to fractionation in countercurrent contact with a substantially pure sulphur dioxide reflux to produce overhead vapors of sulphur dioxide and a relatively high concentration of water substantially free from benzene and a bottoms liquid containing sulphur dioxide and a high concentration of benzene substantially free from water. Division of the vapors between the column F₁ and the condenser 77 may be made by valve 73 as desired.

The said bottoms from the sulphur dioxide fractionator containing sulphur dioxide and a relatively high concentration of benzene are withdrawn through valve 76, cooled in cooler-condenser 77 and returned, together with the condensate formed from the vapors entering through line 75, by means of pump 78 through line 79 and valve 80 to the hereinbefore described sulphur dioxide-benzene storage tank 81.

The fractionated vapors containing sulphur dioxide and water from the top of fractionator F₁ are withdrawn through vapor line 107 and subsequently treated for the removal of the water, as described hereinafter.

The fractionated sulphur dioxide water vapors withdrawn from the top of the sulphur dioxide fractionating column F₁ through vapor line 107 may be introduced at a temperature of about 105° F. and a pressure of about 60 pounds per square inch through valve 108 and line 109 into the bottom portion of a fractionating column F₂ where they are subjected to fractionation in countercurrent contact with a substantially pure sulphur dioxide reflux. This fractionation results in a fractional separation of the sulphur dioxide and water to produce overhead vapors of sulphur dioxide substantially free from water and a bottoms containing water substantially free from sulphur dioxide. The water is withdrawn and disposed of through bottoms draw-off line 111 and the fractionated sulphur dioxide vapors are withdrawn from the top of the column through vapor line 113 from which they may be conducted through line 115, valve 116 and line 123 to a condenser 124. The sulphur dioxide condensate substantially free from water from condenser 124 is returned by way of condensate line 125, valve 126, line 134, pump 135 and line 34 to the sulphur dioxide storage tank 35. Valves 110 and 117 are maintained closed during this operation.

The sulphur dioxide vapors from fractionating column F₂ instead of being conducted directly from column F₂ to the condenser 124 may, by closing valve 116 and opening valve 117, be introduced into a scrubbing chamber S₃ where they are brought into countercurrent contact with sulphuric acid introduced at 122 for the purpose of absorbing any remnants of water vapor carried over from the fractionator F₂. The dehydrated sulphur dioxide vapors are withdrawn from the top of the scrubbing chamber S₃ through line 121 and passed through line 123 to the condenser 124 and the resulting condensate returned to the sulphur dioxide storage tank, as described hereinbefore.

If it is desired to treat the vapors issuing from the sulphur dioxide fractionating column F₁ directly in the sulphuric acid scrubbing tower S₃ for the removal of water without intermediate fractionation the fractionator F₂ may be by-passed by closing valve 108 and opening valve 110.

Instead of operating the sulphur dioxide fractionating column, as hereinbefore described, with subsequent treatment of the fractionated vapors therefrom for the removal of water, it is possible to operate by increasing the sulphur dioxide reflux ratio so that only substantially pure sulphur dioxide vapors are allowed to escape from the top of the sulphur dioxide fractionating column. In this event a concentration of water is caused to take place at an intermediate portion of the sulphur dioxide fractionating column F₁. By withdrawing a partial side cut of this sulphur dioxide reflux condensate containing a high concentration of water from the intermediate point in the column at which it occurs, to a stripping column where the sulphur dioxide and benzene is stripped from the reflux condensate solution containing water and the thus stripped vapors returned to the column, a convenient method of water removal is accomplished.

This side stripping of refluxes containing water is accomplished by removing the partial reflux condensate containing water from an intermediate portion of the fractionating column F₁ through an outlet 140, valve 141 and line 142 into the top of the stripping column S₄ where it is countercurrently contacted with heated stripping vapors formed by the application of heat at the bottom through heating coil 143. The resulting stripped vapors, free from water are returned to the fractionating column F₁ through the vapor return line 145. Water substantially free from sulphur dioxide is withdrawn from the bottom of stripping column S₄ through line 146.

Even in normal operation of the sulphur dioxide fractionating column F₁ high concentrations of water in the reflux in the intermediate portions of the tower may occur at times and it is, therefore, often advantageous to side strip and remove the water from this reflux as described hereinbefore in order to maintain a condition, within the tower, of low water concentrations and a minimum corrosive action.

It is intended that the elimination of water from the recovery system shall be such that the concentrations of water throughout the said system shall always remain below that at which appreciable corrosion of equipment starts to take place. At points in the system where the concentration of water rises above that value and where serious corrosion begins, corrosion resistant material is used. For example, when water concentrations occur in the fractionating columns F and/or $F_2$ corrosion resistant material is provided.

The sulphur dioxide vapors containing water from the sulphur dioxide fractionator $F_1$ may be condensed in condenser 124 directly without previously passing through either fractionating column $F_2$ or scrubber $S_3$ by maintaining valves 108 and 117 closed and valves 110 and 116 open. In this case the water included in the condensate from the condenser 124 may be removed by treatment with sulphuric acid in treating tank $S_5$. In this case the sulphur dioxide condensate from condenser 124 is introduced into the bottom of the sulphuric acid treating tank $S_5$ through valve 128 and line 131, rises upward through a sulphuric acid wash in the lower portion of said tank and accumulates in a separate phase in the top portion thereof. The accumulated acid treated liquid sulphur dioxide is withdrawn from tank $S_5$ through valve 130 and returned through line 134, pump 135 and line 34 to the liquid sulphur dioxide storage tank 35. Valve 126 is maintained closed for the above described acid treatment of the sulphur dioxide condensate.

All or any combination of the hereinbefore described methods of dehydrating the fractionated solvents can be simultaneously utilized.

The treating tank $S_5$ may be by-passed by closing valves 128 and 130 and opening valve 126 to allow the sulphur dioxide condensate containing water to be returned directly to the liquid sulphur dioxide storage tank 35. Valves 108 and 117 are also maintained closed during operation in this manner.

When water concentrations in the sulphur dioxide-benzene stage of the solvent treating process, as described herein, do not occur at high values, it has been found that the fractionated sulphur dioxide vapors containing water produced by the sulphur dioxide fractionating column $F_1$ may be condensed directly without intermediate treatment in either fractionating column $F_2$ or acid scrubbing towers $S_3$ or $S_5$ and the resulting sulphur dioxide condensate, containing water, returned directly, as just described above in connection with the treating tank $S_5$, to the liquid sulphur dioxide storage tank 35. In this manner of operation the water which enters and accumulates in the second sulphur dioxide-benzene treating stage of the solvent treating system is transferred therefrom to the first liquid sulphur dioxide solvent treating stage of the system from which it is subsequently easily removed by the simple fractionation of the vaporized sulphur dioxide solvent as described in connection with fractionating column $F_3$.

In normal operation of this solvent extraction system the operation of the sulphur dioxide fractionating column $F_1$ and associated separator 70 and stripping columns $S_1$ and $S_2$ are regulated to produce a sulphur dioxide-benzene condensate appearing at the outlet of the condenser 77 which contains a slightly lower concentration of sulphur dioxide in the mixture than that desired in the normal sulphur dioxide-benzene solvent contacting the oil to be treated in the second stage treater. Consequently the liquid sulphur dioxide-benzene solvent in storage in tank 81 is slightly deficient in sulphur dioxide. This deficiency is then corrected and the sulphur dioxide-benzene proportion easily adjusted by constantly adding the required amount of liquid sulphur dioxide to the sulphur dioxide-benezene solvent as it is withdrawn from the storage tank 81. This make-up liquid sulphur dioxide is withdrawn from the liquid sulphur dioxide storage system through line 148, valve 154 and is mixed with sulphur dioxide-benzene solvent withdrawn from tank 81 through pump 83, at mixing valve 155. This method of operation is followed to overcome the difficulty encountered in attempting to regulate the sulphur dioxide-benzene recovery and fractionating system so that it will operate in such a manner as to recover the sulphur dioxide-benzene solvent in the exact proportions desired. Normally a ratio of solvents of 70% sulphur dioxide to 30% benzene is used in the treater.

The raffinate withdrawn from the first stage sulphur dioxide treater $T_1$ and introduced as feed to the second stage sulphur dioxide-benezene treater $T_2$ carries over with it, in solution, an appreciable quantity of sulphur dioxide from the first stage treating system to the second stage treating system resulting in a depletion of the sulphur dioxide solvent in the first stage system. This deficiency in the first stage system is overcome by returning to the first stage sulphur dioxide storage system a quantity of liquid sulphur dioxide recovered by distillation from the sulphur dioxide-benzene solvent in the sulphur dioxide fractionating column, and this distillation is provided and regulated for this supply.

The first stage extract from which a large proportion of the liquid sulphur dioxide has been evaporated is withdrawn from the bottom of the separator 25 through line 28. The stripped liquid from stripping columns $S_1$ and $S_2$ comprise the second stage raffinate and extract, respectively, each relatively free from solvents. Additional treatment may be given these solvent treated materials to remove remnants of solvents that remain therein.

Liquid sulphur dioxide refluxes for fractionating columns $F_1$, $F_2$ and $F_3$ are supplied from the liquid sulphur dioxide storage tank 35 by way of valve 147, line 148, valve 149, and line 150. Quantities of reflux to the fractionating columns $F_1$, $F_2$ and $F_3$ are adjusted by means of valves 151, 152 and 153, respectively.

An example of operation of the sulphur dioxide fractionating column $F_1$ is as follows:

A vapor feed, as described hereinbefore, consisting of approximately 460 barrels per day of sulphur dioxide and 380 barrels per day of benzene is introduced into the bottom of the tower at inlet valve 101 at a temperature of 295° F. and a pressure of about 85 pounds per square inch. The feed vapors are those obtained from the stripping columns and the second stage extract separator. Reflux to the sulphur dioxide fractionating column $F_1$, consisting of approximately 470 barrels per day of substantially pure liquid sulphur dioxide, is introduced at the reflux inlet at the top of the tower through valve 151. The fractionated overhead vapors consisting of about 900 barrels per day of sulphur dioxide vapors containing water but substantially free from benzene leave the top of the tower $F_1$ at a temperature of approximately 103° F. and a pressure of 72 pounds per square inch. Bottoms withdrawn from the tower consist of approximately 27 barrels per day of liquid sulphur dioxide and 383 barrels per day of liquid benzene substantially free from water, at a temperature of 230° F.

The sulphur dioxide fractionating tower F₁ contains fifteen perforated fractionating plates designed to work at fifty per cent efficiency and is constructed of a corrosion resistant material, such as Allegheny metal.

An obvious advantage of this invention resides in the elimination of water from the sulphur dioxide-benzene portion of the solvent system from which it would otherwise be difficult or impracticable to eliminate it. The water is thus transferred and concentrated in the sulphur dioxide solvent portion of the system from which it can be easily removed by a single dehydration means.

The foregoing described process and apparatus is merely illustrative and the invention is not limited thereby but may include any process and apparatus which accomplishes the same within the scope of the invention.

We claim:

1. In a process for separating a solvent solution of sulphur dioxide, benzene and water the steps comprising vaporizing the solution, fractionating the vapors in contact with liquid sulphur dioxide reflux substantially free from and at a temperature and pressure which will condense substantially all of the benzene vapors but will allow water vapor to remain uncondensed and producing thereby fractionated overhead vapors consisting of sulphur dioxide and water substantially free from benzene.

2. In a process for separating a solvent solution of sulphur dioxide, benzene and water into its components the steps comprising vaporizing the solution, fractionating the vapors in contact with liquid sulphur dioxide reflux substantially free from and at a temperature and pressure which will condense substantially all of the benzene vapors but will allow water vapor to remain uncondensed and producing thereby fractionated overhead vapors of sulphur dioxide and water substantially free from benzene and liquid sulphur dioxide and benzene bottoms substantially free from water.

3. A process for removing water from solution in a solvent solution of sulphur dioxide and benzene comprising vaporizing the solution, subjecting the vapors to fractionation in contact with liquid sulphur dioxide reflux substantially free from and at a temperature and pressure which will condense substantially all of the benzene vapors but will allow water vapor to remain uncondensed and producing thereby fractionated overhead vapors of sulphur dioxide and water substantially free from benzene, condensing the said vapors, and dehydrating the condensate.

4. A process for removing water from solution in a solvent solution of sulphur dioxide and benzene comprising vaporizing the solution, subjecting the vapors to fractionation in contact with liquid sulphur dioxide substantially free from and at a temperature and pressure which will condense substantially all of the benzene vapors but will allow water vapor to remain uncondensed and producing thereby fractionated overhead vapors of sulphur dioxide and water, substantially free from benzene and dehydrating the said vapors.

5. A process for removing water from solution in a solvent solution of sulphur dioxide and benzene comprising vaporizing the solution, subjecting the vapors to a first stage of fractionation in contact with liquid sulphur dioxide reflux, and producing thereby overhead vapors of sulphur dioxide and water substantially free from benzene, subjecting the said vapors from the first stage fractionation to a second stage of fractionation in contact with liquid sulphur dioxide and producing overhead sulphur dioxide vapors substantially free from water.

6. In a process for separating a solvent solution of sulphur dioxide, benzene and water into its components the steps comprising vaporizing the solution, fractionating the vapors in contact with liquid sulphur dioxide reflux substantially free of benzene and at a temperature and pressure which will condense substantially all of the benzene and water vapors but will allow sulphur dioxide vapor to remain uncondensed and producing thereby fractionated overhead vapors of sulphur dioxide substantially free of benzene and water, withdrawing reflux condensate containing a concentration of water from an intermediate stage of the said fractionation, separating water from the said withdrawn reflux condensate and returning the reflux condensate from which water has been removed to an earlier stage of the said fractionation.

7. In a process for removing water from solution in a solvent solution of sulphur dioxide and benzene the steps comprising vaporizing the solution, fractionating the vapors in contact with liquid sulphur dioxide reflux substantially free of benzene and at a temperature and pressure which will condense substantially all of the benzene and water vapors but will allow sulphur dioxide vapor to remain uncondensed and producing thereby fractionated overhead vapors of sulphur dioxide substantially free of benzene and water, withdrawing an intermediate reflux condensate containing a concentration of water, vaporizing withdrawn reflux condensate to remove it from the water and returning the vapors to an intermediate point in the said fractionation.

8. In a process for the recovery of solvents from a sulphur dioxide and sulphur dioxide-benzene solvent extraction system containing small quantities of water comprising evaporating the sulphur dioxide, benzene and water from the solutes, fractionating the vapors in contact with liquid sulphur dioxide reflux, separating sulphur dioxide and water relatively free from benzene and sulphur dioxide and benzene relatively free from water, returning the sulphur dioxide and water to the first stage treating system and returning the sulphur dioxide and benzene to the second stage treating system and dehydrating the sulphur dioxide solvent cycling through the first stage system.

9. In a process for separating a solvent solution of sulphur dioxide, benzene and water, the steps comprising heating the solution, subjecting the solution to a vaporizing pressure less than approximately 1000 pounds per square inch absolute, fractionating the resultant vapors in countercurrent contact with cooled liquid sulphur dioxide substantially free of benzene and at a temperature which will condense substantially all of the benzene vapors but will allow water vapor to remain uncondensed and producing thereby overhead fractionated vapors of sulphur dioxide and water substantially free of benzene.

10. In a process for separating a solvent solution of sulphur dioxide, benzene and water, the steps comprising heating the solution to a temperature less than approximately 600° F., subjecting the thus heated solution to a vaporizing pressure, fractionating the resultant vapors in countercurrent contact with cooled liquid sulphur dioxide substantially free of benzene and at a temperature which will condense substantially all of the benzene vapors but will allow water vapor to remain uncondensed and producing thereby overhead fractionated vapors of sulphur dioxide and water substantially free of benzene.

11. In a process for separating a solvent solution of sulphur dioxide, benzene and water, the steps comprising heating the solution to a temperature between approximately 200° F. and 515° F., separating the resultant vapors at a pressure between approximately 22 and 1000 pounds per square inch absolute, subjecting the thus separated vapors to countercurrent contact with liquid sulphur dioxide substantially free of benzene and at a temperature which will condense substantially all of the benzene vapors but will allow water vapor to remain uncondensed and thereby producing overhead fractionated vapors of sulphur dioxide and water substantially free of benzene and a bottoms solution of sulphur dioxide and benzene.

12. In a process for separating a solvent solution of sulphur dioxide, benzene and water, the steps comprising heating the solution to a temperature in the range between approximately 32° F. and 600° F., subjecting the thus heated solution to its corresponding vaporizing pressure in the range between approximately atmospheric pressure and 1000 pounds per square inch, subjecting the resultant vapors to a countercurrent contact with liquid sulphur dioxide substantially free of benzene and at a temperature and pressure which will condense substantially all of the benzene vapors but will allow water vapor to remain uncondensed and producing thereby overhead fractionated sulphur dioxide and water vapors substantially free of benzene.

13. A process according to claim 12 in which a bottoms of liquid sulphur dioxide and benzene substantially free of water is produced.

14. In a process for separating a solvent solution of sulphur dioxide, benzene and water into its components the steps comprising vaporizing the solution, fractionating the vapors in contact with liquid sulphur dioxide reflux substantially free from benzene and at a temperature and pressure which will condense substantially all of the benzene and water vapors but will allow sulphur dioxide vapor to remain uncondensed and producing thereby fractionated overhead vapors of sulphur dioxide substantially free from benzene and water, withdrawing intermediate reflux condensate containing a relatively high concentration of water and withdrawing a bottoms containing benzene relatively free from water.

EDWARD G. RAGATZ.
DONALD E. McFADDIN.